United States Patent
Alastalo et al.

(10) Patent No.: US 10,494,464 B2
(45) Date of Patent: Dec. 3, 2019

(54) TWO-STAGE PROCESS FOR PRODUCING POLYPROPYLENE COMPOSITIONS

(71) Applicants: ABU DHABI POLYMERS CO. LTD (BOROUGE) L.L.C., Abu Dhabi (AE); BOREALIS AG, Vienna (AT)

(72) Inventors: Kauno Alastalo, Porvoo (FR); Pauli Leskinen, Helsinki (FI); Johanna Lilja, Porvoo (FI); Cristian Hedesiu, Abu Dhabi (AE)

(73) Assignees: BOREALIS AG, Vienna (AT); ABU DHABI POLYMERS CO. LTD. (BOROUGE) L.L.C., Abu Dhabi (AE)

( * ) Notice: Subject to any disclaimer, the term of this patent is extended or adjusted under 35 U.S.C. 154(b) by 241 days.

(21) Appl. No.: 14/786,471

(22) PCT Filed: Apr. 22, 2014

(86) PCT No.: PCT/EP2014/001075
§ 371 (c)(1),
(2) Date: Oct. 22, 2015

(87) PCT Pub. No.: WO2014/173536
PCT Pub. Date: Oct. 30, 2014

(65) Prior Publication Data
US 2016/0145364 A1    May 26, 2016

(30) Foreign Application Priority Data

Apr. 22, 2013 (EP) .................................... 13002096

(51) Int. Cl.
C08L 23/12    (2006.01)
C08F 210/06   (2006.01)
C08L 23/14    (2006.01)

(52) U.S. Cl.
CPC .......... *C08F 210/06* (2013.01); *C08L 23/142* (2013.01); *C08L 2203/18* (2013.01); *C08L 2205/025* (2013.01); *C08L 2308/00* (2013.01); *C08L 2314/02* (2013.01)

(58) Field of Classification Search
CPC .. C08F 210/06; C08L 23/142; C08L 2203/18; C08L 2205/025; C08L 2308/00; B29C 47/0023
See application file for complete search history.

(56) References Cited

U.S. PATENT DOCUMENTS

| | | |
|---|---|---|
| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,311 A | 7/1985 | Fulks et al. |
| 4,532,313 A | 7/1985 | Matlack |
| 4,543,399 A | 9/1985 | Jenkins, III et al. |
| 4,560,671 A | 12/1985 | Gross et al. |
| 4,578,879 A | 4/1986 | Yokoyama et al. |
| 4,581,342 A | 4/1986 | Johnson et al. |
| 4,582,816 A | 4/1986 | Miro |
| 4,621,952 A | 11/1986 | Aaronson |
| 4,622,361 A | 11/1986 | Gill et al. |
| 4,657,882 A | 4/1987 | Karayannis et al. |
| 4,803,251 A | 2/1989 | Goode et al. |
| 4,855,370 A | 8/1989 | Chirillo et al. |
| 5,026,795 A | 6/1991 | Hogan |
| 5,391,654 A | 2/1995 | Ahvenainen et al. |
| 5,539,067 A | 7/1996 | Parodi et al. |
| 5,618,771 A | 4/1997 | Parodi et al. |

(Continued)

FOREIGN PATENT DOCUMENTS

| | | |
|---|---|---|
| EP | 0045975 A2 | 2/1982 |
| EP | 0045976 A2 | 2/1982 |
| EP | 0045977 A2 | 2/1982 |
| EP | 0047077 A1 | 3/1982 |
| EP | 0188125 A2 | 7/1986 |
| EP | 0250169 A2 | 12/1987 |
| EP | 0372239 A2 | 6/1990 |
| EP | 0479186 A2 | 4/1992 |
| EP | 0560035 A1 | 9/1993 |
| EP | 0579426 A1 | 1/1994 |
| EP | 0600414 A1 | 6/1994 |
| EP | 0607703 A1 | 7/1994 |
| EP | 0683176 A1 | 11/1995 |

(Continued)

OTHER PUBLICATIONS

Geldart et al.: The Design of Distributors for Gas-Fluidized Beds, Powder Technology, 1985; vol. 42.

(Continued)

*Primary Examiner* — Galen H Hauth
(74) *Attorney, Agent, or Firm* — Roberts Mlotkowski Safran Cole & Calderon

(57) ABSTRACT

A process for polymerizing propylene in the presence of a polymerization catalyst by copolymerizing propylene with a comonomer selected from the group of ethylene and C4-C10 alpha-olefins in two polymerization stages. The first polymerization stage is conducted in a loop reactor and the second polymerization stage in a gas phase reactor. The polymer produced in first polymerization stage has a higher melt flow rate and a lower content of comonomer units than the final polymer mixture. The process can be operated with a high throughput and catalyst productivity.

15 Claims, No Drawings

(56) References Cited

U.S. PATENT DOCUMENTS

2005/0154159 A1* 7/2005 DesLauriers ........... C08F 10/00
526/156

FOREIGN PATENT DOCUMENTS

| | | |
|---|---|---|
| EP | 0696293 | 2/1996 |
| EP | 0699213 | 3/1996 |
| EP | 0707513 | 4/1996 |
| EP | 0721798 A2 | 7/1996 |
| EP | 0887379 A1 | 12/1998 |
| EP | 0887380 A1 | 12/1998 |
| EP | 0887381 A1 | 12/1998 |
| EP | 0891990 A2 | 1/1999 |
| EP | 0991684 | 4/2000 |
| EP | 1028984 | 8/2000 |
| EP | 1028985 | 8/2000 |
| EP | 1030878 | 8/2000 |
| EP | 1310295 A1 | 5/2003 |
| EP | 1415999 A1 | 5/2004 |
| EP | 1591460 A1 | 11/2005 |
| EP | 1860125 A1 | 11/2007 |
| EP | 1995259 A1 | 11/2008 |
| EP | 2535372 A1 | 12/2012 |
| GB | 1272778 | 5/1972 |
| GB | 1580635 | 12/1980 |
| WO | 8707620 A1 | 12/1987 |
| WO | 9219653 A1 | 11/1992 |
| WO | 9219658 A1 | 11/1992 |
| WO | 9219659 A1 | 11/1992 |
| WO | 9221705 A1 | 12/1992 |
| WO | 9311165 A1 | 6/1993 |
| WO | 9311166 A1 | 6/1993 |
| WO | 9319100 A1 | 9/1993 |
| WO | 9425495 A1 | 11/1994 |
| WO | 9532994 A1 | 12/1995 |
| WO | 9736939 A1 | 10/1997 |
| WO | 9740080 A1 | 10/1997 |
| WO | 9812234 A1 | 3/1998 |
| WO | 9916797 A1 | 4/1999 |
| WO | 9933842 A1 | 7/1999 |
| WO | 0029452 A1 | 5/2000 |
| WO | 02088194 A1 | 11/2002 |
| WO | 03/000756 A1 | 1/2003 |
| WO | 03000754 A1 | 1/2003 |
| WO | 03000755 A1 | 1/2003 |
| WO | 03000757 A1 | 1/2003 |
| WO | 2004029112 A1 | 4/2004 |
| WO | 2005087361 A1 | 9/2005 |
| WO | 2007025640 A1 | 3/2007 |
| WO | 2014173536 A1 | 10/2014 |

OTHER PUBLICATIONS

Geldart: Gas Fluidization Technology, J.Wiley & Sons, 1986; p. 17-18, 169-186, 183.

International Search Report and Written Opinion of PCT/EP2014/001075 dated May 30, 2014.

International Preliminary Report on Patentability of related Application No. PCT/EP2014/001075 dated Oct. 27, 2015.

* cited by examiner

TWO-STAGE PROCESS FOR PRODUCING POLYPROPYLENE COMPOSITIONS

FIELD OF THE INVENTION

The present invention is directed to a method of producing propylene polymers. Especially, the present method is directed to a method of producing propylene copolymers having a broad molecular weight distribution. In particular, the present method is directed to a method of polymerizing propylene with comonomers in two stages. The resulting polymers are well suited for producing pipes.

Problem to be Solved

It is known in the art to polymerize propylene in two or more stages to produce resins useful for making pipes, for instance, from WO-A-1997040080 and EP-A-887380. Such methods often produce a high molecular weight copolymer in a first polymerization stage and a low molecular weight copolymer in a subsequent polymerization step.

Such methods have a disadvantage in that for some polymerization catalysts the activity of the catalyst is reduced when the polymerization is conducted at a low hydrogen concentration. It may then be necessary to operate the reactors at a lower production rate than would otherwise be possible in order to reach a desired content of the high molecular weight component in the polymer. This leads to an economical loss.

Furthermore, when the polymer containing the active catalyst is transferred into the second polymerization stage where hydrogen is present in high concentration then the activity of the catalyst increases and it may be necessary to take steps of reducing the activity, such as by feeding activity retarders into the second polymerization stage.

It is also known to produce the low molecular weight copolymer in first polymerization step and the high molecular weight copolymer in the subsequent polymerization step. Such process is disclosed in examples 4 and 13 of WO-A-1997040080. The disadvantage of such process is that it requires a hydrogen removal step, such as flashing step, between the first and the second polymerization stages. Otherwise it may be not possible to reach the desired properties of the final polymer.

It is also known to operate the above-mentioned process without flashing step, as was done in examples 2 and 3 of WO-A-1999016797. The resulting polymer had a melt flow rate $MFR_2$ of higher than 2 g/10 min, however, which makes it unsuitable for pipe applications.

The objective of the present invention is thus to overcome the problems of prior art processes and to provide a process which allows the production of propylene copolymer compositions suitable for making pipes. Especially, the objective is to provide a process having improved production economy which allows the production of polypropylene compositions suitable for pipe-making. The process according to the invention has an increased throughput and/or an improved productivity of catalyst compared to prior art processes.

SUMMARY OF THE INVENTION

As seen from one aspect, the present invention provides a process for polymerizing propylene in the presence of a polymerization catalyst comprising (I) a solid catalyst component comprising a magnesium halide, a titanium halide and an internal electron donor; and (II) a cocatalyst comprising an aluminium alkyl and optionally an external electron donor, said process comprising the steps of:

(A) continuously introducing streams of propylene, a comonomer selected from the group of ethylene and C4-C10 alpha-olefins, hydrogen and said polymerization catalyst into a loop reactor at a temperature of from 65 to 100° C. and a pressure of from 25 to 100 bar to produce slurry of particles of a first copolymer of propylene having a melt flow rate $MFR_2$ of from 0.3 to 5.0 g/10 min and a content of comonomer units of from 0.1 to 6 mol-% in a first reaction mixture;

(B) continuously withdrawing a slurry stream from said loop reactor, said slurry stream comprising said particles of the first copolymer of propylene, said particles further comprising said polymerization catalyst, and passing the slurry stream into a gas phase reactor;

(C) continuously introducing streams of propylene, a comonomer selected from the group of ethylene and C4-C10 alpha-olefins and optionally hydrogen into said gas phase reactor at a temperature of from 65 to 100° C. and a pressure of from 10 to 40 bar to produce particles comprising a copolymer mixture of said first copolymer of propylene and a second copolymer of propylene, said copolymer mixture having a content of comonomer units from 2 to 12 mol-% and a melt flow rate $MFR_2$ of 0.05 to 0.7 g/10 min; wherein said copolymer mixture comprises from 30 to 60% by weight of said first copolymer and from 40 to 70% by weight of said second copolymer, and wherein the melt flow rate $MFR_2$ of said copolymer mixture is lower than the melt flow rate $MFR_2$ of said first copolymer and the content of comonomer units in said copolymer mixture is higher than the content of comonomer units in said first copolymer;

(D) continuously withdrawing a stream comprising said copolymer mixture from said gas phase reactor;

(E) removing hydrocarbons from said stream to produce a polymer stream with reduced content of hydrocarbons and optionally introducing additives to the copolymer mixture;

(F) extruding said copolymer mixture into pellets.

As seen from another aspect the present invention provides a process for producing a pipe comprising the steps of:

(1) producing a propylene polymer composition according to the process as described above;

(2) extruding said propylene polymer composition into a pipe.

DETAILED DESCRIPTION

Even though the present invention relates to a two stage process for producing polypropylene compositions it should be understood that the process may contain additional polymerization stages to the two stages disclosed above. It may contain additional polymerization stages, such as a prepolymerization stage, as long as the polymer produced in such additional stages does not substantially influence the properties of the polymer. Furthermore, either one or both of the two polymerization stages disclosed above may be conducted as two or more sub-stages, provided that the polymer produced in each such sub-stage as well as their mixture matches the description for the polymer for the respective stage. However, it is preferred to conduct each of the first and the second polymerization stage as a single polymerization stage in order to prevent the process from becoming unnecessarily complex. Therefore, in the most preferred embodiment the polymerization process consists of two polymerization stages which may be preceded a prepolymerization stage.

The present invention is directed to producing copolymers of propylene and a comonomer selected from the group consisting of ethylene and alpha-olefins having from 4 to 10 carbon atoms. Preferably the comonomer is selected from the group of ethylene and alpha-olefins having from 4 to 8 carbon atoms. Especially preferably the comonomer is ethylene.

Catalyst

The polymerisation can be carried out in the presence of a metallocene catalyst or Ziegler-Natta-type catalyst, the latter is in particular preferred.

A Ziegler-Natta type catalyst typically used in the present invention for propylene polymerization is stereospecific, high yield Ziegler-Natta catalyst comprising as essential components Mg, Ti, Al and Cl. This type of catalysts comprise typically in addition to a solid transition metal (like Ti) component a cocatalyst(s) as well external donor(s) as stereoregulating agent.

These compounds may be supported on a particulate support, such as inorganic oxide, like silica or alumina, or, usually, the magnesium halide may form the solid support. It is also possible that solid catalysts are self supported, i.e. the catalysts are not supported on an external support, but are prepared via emulsion-solidification method.

The solid transition metal component usually also comprises an electron donor (internal electron donor). Suitable internal electron donors are, among others, esters of carboxylic acids, like phthalates, citraconates, and succinates. Also oxygen- or nitrogen-containing silicon compounds may be used.

The cocatalyst used in combination with the transition metal compound typically comprises an aluminium alkyl compound. The aluminium alkyl compound is preferably trialkyl aluminium such as trimethylaluminium, triethylaluminium, tri-isobutyl aluminium or tri-n-octylaluminium. However, it may also be an alkyl aluminium halide, such as diethyl aluminium chloride, dimethylaluminium chloride and ethylaluminium sesquichloride. Triethylaluminium is an especially preferred aluminium alkyl compound. The aluminium alkyl is preferably introduced to reach a desired ratio of the aluminium to titanium. Suitable ratios depend on the catalyst and lie within the range of from 30 to 1000 mol/mol, such as 50 to 800 mol/mol.

Preferably the catalyst also comprises an external electron donor. Suitable electron donors known in the art include ethers, ketones, amines, alcohols, phenols, phosphines and silanes. Silane type external donors are typically organosilane compounds containing Si—OCOR, Si—OR, or Si—NR$_2$ bonds, having silicon as the central atom, and R is an alkyl, alkenyl, aryl, arylalkyl or cycloalkyl with 1-20 carbon atoms are known in the art. Organosilane compounds are preferred external donors, with dicyclopentyldimethoxysilane and cyclohexylmethyldimethoxysilane being especially preferred. The organosilane compound is typically introduced to keep a desired molar ratio between aluminium alkyl and the silane compound, such as Al/Ti from 3 to 20 mol/mol or from 4 to 15 mol/mol.

Examples of suitable catalysts and compounds in catalysts are shown in among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, WO 92/19659, WO 92/19653, WO 92/19658, U.S. Pat. Nos. 4,382,019, 4,435,550, 4,465,782, 4,473,660, 4,560,671, 5,539,067, 5,618,771, EP45975, EP45976, EP45977, WO 95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882.

The catalyst is preferably modified by prepolymerizing a vinyl compound in the presence of the catalyst so that the modified catalyst contains up to 5 grams of prepolymer per gram of solid catalyst component. Preferably, the vinyl compound is of the formula CH$_2$=CH—CHR$_6$R$_7$, wherein R$_6$ and R$_7$ together form a 5- or 6-membered saturated, unsaturated or aromatic ring or independently represent an alkyl group comprising 1 to 4 carbon atoms. Preferably vinyl compound is vinylcyclohexane or 3-methyl-1-butene. Especially preferably the catalyst contains from 0.1 to 2 grams of poly(vinylcyclohexane) or poly(3-methyl-1-butene) per one gram of solid catalyst component. This allows the preparation of nucleated polypropylene as disclosed in EP 607703, EP 1028984, EP 1028985 and EP 1030878.

Prepolymerization

In a preferred embodiment the first polymerization stage is preceded by a prepolymerization stage. The prepolymerization is conducted in a continuous manner as bulk slurry polymerization in liquid propylene, i.e. the liquid phase mainly comprises propylene, with minor amount of other reactants and optionally inert components dissolved therein. Preferably the prepolymerization is conducted in a continuous stirred tank reactor or a loop reactor.

The prepolymerization reaction is typically conducted at a temperature of 0 to 60° C., preferably from 10 to 50° C.

The pressure in the prepolymerization reactor is not critical but must be sufficiently high to maintain the reaction mixture in liquid phase. Thus, the pressure may be from 20 to 100 bar, for example 30 to 70 bar.

The reaction conditions are well known in the art as disclosed, among others, in GB 1580635.

In the prepolymerization step it is also possible to feed comonomers into the prepolymerization stage. Examples of suitable comonomers are ethylene or alpha-olefins having from 4 to 10 carbon atoms. Especially suitable comonomers are ethylene, 1-butene, 1-hexene, 1-octene or their mixtures.

First Polymerization Stage

In a first polymerization stage a first copolymer of propylene is produced. This is done by introducing a polymerization catalyst, optionally through the prepolymerization stage as disclosed above, into the first polymerization stage together with a first monomer mixture containing propylene and a comonomer selected from ethylene and alpha-olefins containing 4 to 10 carbon atoms. The content of the comonomers is controlled to obtain a desired content of comonomer units in the first copolymer. Typically the first copolymer contains from 0.1 to 6% by mole of units derived from the comonomer and from 94 to 99.9% by mole of propylene units. Preferably, the first copolymer contains from 0.5 to 5% by mole of units derived from the comonomer and from 95 to 99.5% by mole of propylene units.

The first copolymer produced in the first polymerization stage has a melt index MFR$_2$ of from 0.3 to 5.0 g/10 min. Preferably the melt index MFR$_2$ of the first copolymer is from 0.3 to 3 g/10 min and more preferably from 0.35 to 2 g/10 min. It is important that the melt index of the first copolymer remains within these limits. If the melt index is higher, then a high amount of hydrogen would be needed to reach the melt index and a separation step to remove hydrogen would be needed. Otherwise it would not be possible to reach the desired melt index in the second polymerization stage. On the other hand, a too low melt index of the first copolymer would lead to an insufficiently narrow molecular weight distribution and thus unacceptable polymer properties.

The first copolymer produced in the first polymerization stage is semicrystalline and not amorphous. Therefore it has a substantial fraction which is not soluble in xylene at 25° C. The first copolymer preferably has a content of xylene soluble fraction at 25° C. of from 0.1 to 10% by weight, preferably from 1 to 8% by weight.

The polymerization in the first polymerization zone is conducted in slurry in a loop reactor. For this reason the terms "first polymerization stage" and "loop reactor" may be used interchangeably within the context of the present invention. Then the polymer particles formed in the polymerization, together with the catalyst fragmented and dispersed within the particles, are suspended in the fluid hydrocarbon. The slurry is agitated to enable the transfer of reactants from the fluid into the particles. In loop reactors the slurry is circulated with a high velocity along a closed pipe by using a circulation pump. Loop reactors are well known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

Slurry polymerization is preferably a so called bulk polymerization. By "bulk polymerization" is meant a process where the polymerization is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerization, the inert components tend to accumulate, and thus the reaction medium may comprise up to 40% by weight of other compounds than monomer. It is to be understood, however, that such a polymerization process is still within the meaning of "bulk polymerization", as defined above.

The temperature in the slurry polymerization is typically from 50 to 110° C., preferably from 60 to 100° C. and in particular from 65 to 95° C. The pressure is from 1 to 150 bar, preferably from 10 to 100 bar.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerization stage other components are also introduced as it is known in the art. Thus, hydrogen is used to control the molecular weight of the polymer. Process additives, such as antistatic agent, may be introduced into the reactor to facilitate a stable operation of the process.

Hydrogen feed is typically adjusted to maintain constant hydrogen to propylene ratio within the loop reactor. The ratio is maintained at such a value that the melt index $MFR_2$ of the first copolymer is at the desired value. While the actual value of the required hydrogen to propylene ratio depends, among others, on the catalyst and polymerization conditions it has been found that when the ratio is within the range of from 0.15 to 3.0 mol/kmol (or, mol/1000 mol), preferably from 0.15 to 2.0 mol/kmol, good results have been obtained.

Comonomer feed is typically adjusted to maintain constant comonomer to propylene ratio within the loop reactor. The ratio is maintained at such a value that the comonomer content of the first copolymer is at the desired value. While the actual value of the required comonomer to propylene ratio depends, among others, on the catalyst, type of comonomer and polymerization conditions it has been found that when the ratio is within the range of from 0.2 to 20 mol/kmol, preferably from 1 to 10 mol/kmol good results have been obtained.

According to the present invention the slurry is conducted directly into the gas phase polymerization stage. By "directly" it is meant that the slurry is introduced from the loop reactor into the gas phase reactor without a flash step between the slurry and gas phase polymerization stages for removing at least a part of the reaction mixture from the polymer. Thereby, substantially the entire slurry stream withdrawn from the first polymerization stage is passed to the second polymerization stage. This kind of direct feed is described in EP-A-887379, EP-A-887380, EP-A-887381 and EP-A-991684. However, it is within the scope of the present invention to take small samples or sample streams from the polymer or from the fluid phase or from both for analyzing the polymer and/or the composition of the reaction mixture. As understood by the person skilled in the art, the volume of such sample streams is small compared to the total slurry stream withdrawn from the loop reactor and typically much lower than 1% by weight of the total stream, such as at most 0.1% or 0.01% or even 0.001% by weight.

Second Polymerization Stage

In the second polymerization stage a copolymer mixture comprising the first copolymer and a second copolymer is formed. This is done by introducing the particles of the first copolymer, containing active catalyst dispersed therein, together with additional propylene and comonomer into the second polymerization stage. This causes the second copolymer to form on the particles containing the first copolymer. The second polymerization stage is conducted in a fluidized bed gas phase reactor. For this reason the terms "second polymerization stage" and "gas phase reactor" may be used interchangeably within the context of the present invention.

The comonomer is selected from ethylene and alpha-olefins containing 4 to 10 carbon atoms. The comonomer used in the second polymerization stage may be the same as or different from the comonomer used in the first polymerization stage. Preferably the same comonomer is used in the first and the second polymerization stages. Especially preferably the comonomer is ethylene.

Also in the second polymerization stage the content of the comonomers is controlled to obtain the desired comonomer content of the copolymer mixture. Typically the copolymer mixture contains from 2 to 12% by mole of units derived from the comonomer and from 88 to 98% by mole of propylene units. Preferably the copolymer mixture contains from 4 to 10% by mole of units derived from the comonomer and from 90 to 96% by mole of propylene units. Furthermore, the comonomer content of the copolymer mixture is higher than the comonomer content of the first copolymer. Preferably the ratio of the comonomer content of the first copolymer to the comonomer content of the copolymer mixture (both expressed in mol-%), $C_1/C_b$, is not higher than 0.95, more preferably not higher than 0.9 and especially preferably not higher than 0.8. Typically the ratio is at least 0.1.

The second copolymer produced in the second polymerization stage is semicrystalline and not amorphous. Therefore it has a substantial fraction which is not soluble in xylene at 25° C. The copolymer mixture preferably has a content of xylene soluble fraction of from 2 to 15% by weight, preferably from 3 to 10% by weight.

The melt index $MFR_2$ of the copolymer mixture is from 0.05 to 0.7 g/10 min. Preferably the melt index $MFR_2$ of the copolymer mixture is from 0.07 to 0.5 g/10 min, more preferably from 0.1 to 0.4 g/10 min. Furthermore, the melt index of the copolymer mixture is lower than the melt index of the first copolymer. Preferably, the ratio of the melt index of the copolymer mixture to the melt index of the first copolymer, $MFR_{2,b}/MFR_{2,1}$, has a value of not higher than 0.8, more preferably not higher than 0.6 and in particular not higher than 0.5.

Preferably the ratio $C_1/C_b$ is not higher than 0.95 and the ratio $MFR_{2,b}/MFR_{2,1}$ is not higher than 0.8; more preferably the ratio $C_1/C_b$ is not higher than 0.9 and the ratio $MFR_{2,b}/MFR_{2,1}$ is not higher than 0.6; and in particular the ratio $C_1/C_b$ is not higher than 0.8 and the ratio $MFR_{2,b}/MFR_{2,1}$ is not higher than 0.5.

As it is well known in the art the melt index $MFR_2$ of the second copolymer produced in the second polymerization stage cannot be directly measured because the second copolymer cannot be isolated from the copolymer mixture. However, by knowing the weight fractions of the first and second copolymers in the copolymer mixture and the melt indices of the first copolymer and the copolymer mixture it is possible to calculate the $MFR_2$ of the second copolymer. This can be done by using the equation $$MI_b = (w_1 \cdot MI_1^{-0.0965} + w_2 \cdot MI_2^{-0.0965})^{-\frac{1}{0.0965}} \qquad \text{(eq. 1)}$$

Where w is the weight fraction of the component in the mixture, MI is the melt index $MFR_2$ and subscripts b, 1 and 2 refer to the mixture, component 1 and component 2, respectively. By calculating the $MFR_2$ of the second copolymer it can be found to lie within the range of from 0.01 to 0.3 g/10 min, preferably 0.03 to 0.15 g/10 min.

Also the comonomer content of the second copolymer cannot be directly measured. However, by using the standard mixing rule it can be calculated from the comonomer contents of the copolymer mixture and the first copolymer.

$$C_b = w_1 \cdot C_1 + w_2 \cdot C_2 \qquad \text{(eq. 2)}$$

where C is the content of comonomer in weight-%, w is the weight fraction of the component in the mixture and subscripts b, 1 and 2 refer to the overall mixture, component 1 and component 2, respectively. The second copolymer can then be found to contain preferably from 4 to 12% by mole of units derived from the comonomer and from 88 to 96% by mole of propylene units. More preferably, the second copolymer contains from 4 to 10% by mole of units derived from the comonomer and from 90 to 96% by mole of propylene units.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \qquad \text{(eq. 3)}$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

The content of the xylene soluble polymer in the second copolymer cannot be directly measured. The content can be estimated, however, by using the standard mixing rule:

$$XS_b = w_1 \cdot XS_1 + w_2 \cdot XS_2 \qquad \text{(eq. 4)}$$

where XS is the content of xylene soluble polymer in weight-%, w is the weight fraction of the component in the mixture and subscripts b, 1 and 2 refer to the overall mixture, component 1 and component 2, respectively. The second copolymer typically can be found to have a content of xylene soluble polymer of not higher than 20% by weight, preferably not higher than 15% by weight. Typically the fraction of xylene soluble polymer in the second copolymer is at least 1%, preferably at least 5% by weight.

The copolymer mixture preferably comprises from 35 to 60% by weight of the first copolymer and from 40 to 65% by weight of the second copolymer.

When the entire slurry stream from the first polymerization stage is introduced into the second polymerization stage then substantial amounts of propylene, comonomer and hydrogen are introduced into the second polymerization stage together with the polymer. However, this is generally not sufficient to maintain desired propylene and comonomer concentrations in the second polymerization stage. Therefore additional propylene and comonomer are typically introduced into the second polymerization stage. They are introduced to maintain a desired propylene concentration and to reach a desired ratio of comonomer to propylene in the fluidization gas. Even though the actual comonomer to monomer ratio that is needed to reach the desired content of comonomer in the polymer depends on the catalyst used in the process, the composition of the monomer and comonomer feeds is suitably adjusted so that the fluidization gas has a ratio of ethylene to propylene of about 10 to 100 mol/kmol (or, mol/1000 mol), preferably from 15 to 70 mol/kmol. Such ratios have been found to yield good results for some catalysts.

It is also often necessary to introduce additional hydrogen into the second polymerization stage to control the melt index of the copolymer mixture. Suitably, the hydrogen feed is controlled to maintain constant hydrogen to propylene ratio in the fluidization gas. The actual ratio depends on the catalyst. Good results have been obtained by maintaining the ratio within the range of from 0.1 to 3 mol/kmol, preferably from 0.2 to 2 mol/kmol.

In a fluidized bed gas phase reactor olefins are polymerized in the presence of a polymerization catalyst in an upwards moving gas stream. The reactor typically contains a fluidized bed comprising the growing polymer particles containing the active catalyst, said fluidized bed having its base above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the transport velocity, as otherwise the whole bed would be entrained with the fluidization gas. The bed voidage then is then typically less than 0.8, preferably less than 0.75 and more preferably less than 0.7. Generally the bed voidage is at least 0.6. An overview is given, among others in Geldart: Gas Fluidization Technology, J. Wiley & Sons, 1986 in chapters 2.4 and 2.5 (pages 17-18) as well as in chapters 7.3 to 7.5 (pages 169-186, especially FIG. 7.21 on page 183).

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 65 to 90° C. The pressure is suitably from 10 to 40 bar, preferably from 15 to 30 bar.

Extrusion

When the polymer has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, pigments and so on.

The polymer is then extruded to pellets as it is known in the art. Preferably co-rotating twin screw extruder is used for the extrusion step. Such extruders are manufactured, for instance, by Coperion (Werner & Pfleiderer) and Japan Steel Works.

Pipes are produced according to the methods known in the art the copolymer mixture which has been extruded to pellets as disclosed above. Thus, according to one preferred method the polymer composition is extruded through an annular die to a desired internal diameter, after which the polymer composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube. The tube is cooled by using a jacket or by passing cold water over it.

According to another method a water-cooled extension is attached to the end of the die mandrel. The extension is thermally insulated from the die mandrel and is cooled by water circulated through the die mandrel. The extrudate is drawn over the mandrel which determines the shape of the pipe and holds it in shape during cooling. Cold water is flowed over the outside pipe surface for cooling.

According to still another method the extrudate leaving the die is directed into a tube having perforated section in the centre. A slight vacuum is drawn through the perforation to hold the pipe hold the pipe against the walls of the sizing chamber.

After the sizing the pipe is cooled, typically in a water bath having a length of about 5 meters or more.

Benefits of the Invention

As it has been described above, the process of the present invention is capable of producing high-quality polypropylene pipe materials efficiently and economically. It can be operated without difficulty and with balanced activity of the catalyst in both reactors. It has been found that when the polymer components produced in each reactor are designed as defined above then the desired polymer properties can be reached even though no hydrogen removal between the loop and the gas phase reactors takes place. Surprisingly, the hydrogen passed from the first polymerization stage to the second polymerization stage does not disturb the polymerization in the second polymerization stage.

Description of Methods

Melt Flow Rate

Melt flow rate (MFR, MFR$_2$) was determined according to ISO 1133 at 230° C. under the load of 2.16 kg.

The melt index MFR$_2$ is herein assumed to follow the following mixing rule (equation 1):

$$MI_b = (w_1 \cdot MI_1^{-0.0965} + w_2 \cdot MI_2^{-0.0965})^{-\frac{1}{0.0965}} \quad \text{(eq. 1)}$$

Where w is the weight fraction of the component in the mixture, MI is the melt index MFR$_2$ and subscripts b, 1 and 2 refer to the mixture, component 1 and component 2, respectively.

Content of Comonomer

Ethylene content, i.e., the content of ethylene units in propylene polymer was measured by Fourier transmission infrared spectroscopy (FTIR). A thin film of the sample (thickness approximately 250 μm) was prepared by hot-pressing. The area of —CH2- absorption peak (800-650 cm$^{-1}$) was measured with Perkin Elmer FTIR 1600-spectrometer. The method was calibrated by ethylene content data measured by $^{13}$C NMR.

The comonomer content is herein assumed to follow the mixing rule (equation 2):

$$C_b = w_1 \cdot C_1 + w_2 \cdot C_2 \quad \text{(eq. 2)}$$

Where C is the content of comonomer in weight-%, w is the weight fraction of the component in the mixture and subscripts b, 1 and 2 refer to the overall mixture, component 1 and component 2, respectively.

Xylene Soluble

The amount of xylene soluble fraction was determined according to ISO 16152. The amount of polymer which remains dissolved at 25° C. after cooling is given as the amount of xylene soluble polymer.

The content of xylene soluble polymer is herein assumed to follow the mixing rule (equation 4):

$$XS_b = w_1 \cdot XS_1 + w_2 \cdot XS_2 \quad \text{(eq. 4)}$$

Where XS is the content of xylene soluble polymer in weight-%, w is the weight fraction of the component in the mixture and subscripts b, 1 and 2 refer to the overall mixture, component 1 and component 2, respectively.

Flexural Modulus

The flexural test was carried out according to the method of ISO 178 by using injection molded test specimens produced according to EN ISO 1873-2 (80*10×4 mm$^3$).

Flexural Modulus was determined at a cross-head speed of 2 mm/min, flexural strength at a cross head speed of 50 mm/min.

Pipe Pressure Test

Pressure test performance was measured according to ISO 1167. In this test, a specimen is exposed to constant circumferential (hoop) stress of 16 MPa at elevated temperature of 20° C. in water-in-water or 4.9 MPa at a temperature of 95° C. in water-in-water. The time in hours to failure is recorded. The tests were performed on pipes produced on conventional pipe extrusion equipment, the pipes having a diameter of 32 mm and a wall thickness of 3 mm.

EXAMPLES

Catalyst Preparation

First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried.

Prepolymerization with Vinylcyclohexane

Triethylaluminium (TEAL), dicyclopentyldimethoxysilane (DCPDMS) as donor (Do), catalyst as produced above and vinylcyclohexane (VCH) were added into oil, e.g. Technol 68, provided in amounts so that Al/Ti was 3-4 mol/mol, Al/Do was as well 3-4 mol/mol, and weight ratio of VCH/solid catalyst was 1/1. The mixture was heated to 60-65° C. and allowed to react until the content of the unreacted vinylcyclohexane in the reaction mixture was less than 1000 ppm. Catalyst concentration in the final oil-catalyst slurry was 10-20 by weight.

Example 1

A stirred tank reactor having a volume of 45 dm$^3$ was operated as liquid-filled at a temperature of 26° C. and a pressure of 54 bar. Into the reactor was fed propylene so much that the average residence time in the reactor was 0.3 hours together with 0.5 g/h hydrogen and 1.4 g/h of a VCH-prepolymerized polymerization catalyst prepared according to Catalyst Preparation Example above with triethyl aluminium (TEA) as a cocatalyst and dicyclopentyldimethoxysilane (DCPDMS) as external donor so that the molar ratio of TEA/Ti was about 445 mol/mol and TEA/DCPDMS was 14 mol/mol. The slurry from this prepolymerization reactor was directed to a loop reactor having a volume of 150 dm$^3$ together with 198 kg/h of propylene, 2.3 kg/h ethylene and hydrogen so that the molar ratio of hydrogen to propylene was 0.35 mol/kmol. The loop reactor was operated at a temperature of 70° C. and a pressure of 53 bar. The production rate of propylene copolymer was 27 kg/h, the ethylene content of the copolymer was 3.2% by weight and the melt flow rate MFR$_2$ was 0.43 g/10 min.

The polymer slurry from the loop reactor was directly conducted into a gas phase reactor operated at a temperature of 85° C. and a pressure of 27 bar. Into the reactor were fed additional propylene, ethylene and hydrogen, as well as nitrogen as inert gas, so that the content of propylene was 88% by mole, the ratio of ethylene to propylene was 25 mol/kmol and the ratio of hydrogen to propylene was 0.44 mol/kmol. The production rate in the reactor was 40 kg/h and the polymer withdrawn from the reactor had a melt flow rate MFR$_2$ of 0.13 g/10 min and an ethylene content of 3.6% by weight. The split of the polymer produced in the loop reactor to the polymer produced in the gas phase reactor was 40:60.

The polymer was withdrawn from the reactor and mixed with effective amounts of Irgafos 168, Irganox 1010 and calcium stearate. In addition 5000 ppm Irganox1030 was added to the composition, based on the weight of the polymer. The mixture of polymer and additives was then extruded to pellets by using a ZSK70 extruder (product of Coperion) under nitrogen atmosphere. The melt temperature was 291° C. and SEI was 284 kWh/ton.

Examples 2 to 7

The procedure of Example 1 was followed except that the operation conditions in the loop reactor and the gas phase reactor were modified as shown in Table 1.

Comparative Examples 1 and 2

The procedure of Example 1 was repeated except that the process was operated with conditions shown in Table 2 and that the step of prepolymerizing the catalyst with vinylcyclohexane was not used.

The polymers of Examples 2, 5 and 7 and Comparative Examples 1 and 2 were extruded to pipes having a diameter of 32 mm and a wall thickness of 3 mm by using a Reifenhauser 381-1-70-30 pipe extruder. The material behaviour in the extruder corresponds with MFR; the lower the MFR, the higher melt pressure and temperature and the lower the output. Output of the extruder was 46 . . . 48 kg/h, melt pressure was 200 . . . 255 barg and the melt temperature was 230 . . . 245° C. The thus obtained pipes were subjected to pressure testing as defined above. The results are shown in Table 4.

TABLE 1

Polymerization data of Examples 1 to 7

| | Example | | | | | | |
|---|---|---|---|---|---|---|---|
| | 1 | 2 | 3 | 4 | 5 | 6 | 7 |
| Prepol Temperature, ° C. | 26 | 26 | 26 | 26 | 26 | 26 | 25 |
| Loop Temperature, ° C. | 70 | 70 | 70 | 70 | 70 | 70 | 70 |
| Loop H2/C3 mol/kmol | 0.35 | 0.40 | 0.59 | 0.67 | 0.65 | 0.95 | 0.96 |
| Loop C2/C3 mol/kmol | 8 | 7.9 | 4.6 | 4.6 | 4.5 | 1.3 | 1.3 |
| Loop MFR$_2$, g/10 min | 0.43 | 0.41 | 0.76 | 0.76 | 0.85 | 1.5 | 1.6 |
| Loop C2-content by weight (mol) | 3.2 (4.7) | 3.0 (4.4) | 1.6 (2.4) | 1.7 (2.5) | 1.7 (2.5) | 0.50 (0.75) | 0.45 (0.67) |
| Loop XS % by weight | 5.7 | 5.6 | 3.9 | 3.4 | 3.2 | 1.6 | 1.6 |
| GPR Temperature, ° C. | 85 | 85 | 85 | 85 | 85 | 80 | 80 |
| GPR Pressure, Bar | 27 | 27 | 27 | 27 | 27 | 27 | 27 |
| GPR H2/C3 mol/kmol | 0.44 | 0.43 | 0.61 | 0.71 | 0.72 | 0.99 | 1.2 |
| GPR C2/C3 mol/kmol | 25 | 25 | 32 | 32 | 32 | 44 | 45 |
| Final MFR$_2$, g/10 min | 0.13 | 0.10 | 0.15 | 0.18 | 0.18 | 0.19 | 0.22 |
| Final C2-content % by weight (mol) | 3.6 (5.3) | 3.7 (5.5) | 3.7 (5.5) | 3.7 (5.5) | 3.7 (5.5) | 3.8 (5.6) | 3.8 (5.6) |
| Final XS % by weight | 5.6 | 5.4 | 5.8 | 5.9 | 6.2 | 7.1 | 7.3 |
| Split Loop:gpr | 40:60 | 36:64 | 42:58 | 44:56 | 41:59 | 44:56 | 42:58 |
| Total productivity kg PP/g cat. | 48 | 49 | 48 | 48 | 52 | 41 | 43 |
| MFR$_2$(final)/MFR$_2$(loop) | 0.3 | 0.24 | 0.2 | 0.24 | 0.21 | 0.13 | 0.14 |
| C2(loop)/C2(final) | 0.89 | 0.80 | 0.44 | 0.45 | 0.45 | 0.13 | 0.12 |

TABLE 2

Polymerization data of Comparative Examples 1 and 2

| | Comparative Example | |
|---|---|---|
| | 1 | 2 |
| Prepol Temperature, ° C. | 26 | 26 |
| Loop Temperature, ° C. | 68 | 68 |
| Loop H2/C3 mol/kmol | 0.06 | 0.06 |
| Loop C2/C3 mol/kmol | | |
| Loop MFR10, g/10 min | 1.1 | 0.85 |
| Loop C2-content % by weight (mol) | 3.5 (5.2) | 4.5 (6.6) |
| GPR Temperature, ° C. | 70 | 70 |
| GPR Pressure, Bar | 27 | 27 |
| GPR H2/C3 mol/kmol | 26 | 34 |
| GPR C2/C3 mol/kmol | | |
| Final MFR2, g/10 min | 0.20 | 0.18 |
| Final C2-content % by weight (mol) | 3.3 (4.9) | 3.7 (5.5) |
| Split Loop:gpr | 53:47 | 60:40 |
| Total productivity kg PP/g cat | 33 | 32 |

TABLE 3

Calculated properties for the copolymer produced in the gas phase reactor

| | Example | | | | | | |
|---|---|---|---|---|---|---|---|
| | 1 | 2 | 3 | 4 | 5 | 6 | 7 |
| MFR2 | 0.06 | 0.05 | 0.05 | 0.07 | 0.07 | 0.05 | 0.07 |
| C2-content % by weight (mol) | 3.8 (5.6) | 3.8 (5.6) | 4.9 (7.2) | 4.9 (7.2) | 4.6 (6.8) | 5.8 (8.4) | 6.0 (8.8) |
| XS % by weight | 5.5 | 5.3 | 7.2 | 7.9 | 8.3 | 11.4 | 11.4 |

TABLE 4

Properties measured from selected materials

| | Example | | | | |
|---|---|---|---|---|---|
| | 2 | 5 | 7 | CE1 | CE2 |
| Flex modulus, MPa | 952 | 930 | 929 | 931 | 850 |
| Pipe pressure test 16 MPa, 20° C., hours | 33 | 30 | 48 | 48 | 18 |
| Pipe pressure test 4.9 MPa, 95° C., hours | >300 (interrupted) | >300 (interrupted) | >300 (interrupted) | >300 (interrupted) | >300 (interrupted) |

The examples and comparative examples thus show that the method of the present invention yields pipe resins having similar properties to the reference prior art resins but the present process gives 30 to 40% higher productivity for the catalyst.

The invention claimed is:

1. A process for polymerizing propylene in the presence of a polymerization catalyst comprising (I) a solid catalyst component comprising a magnesium halide, a titanium halide and an internal electron donor; and (II) a cocatalyst comprising an aluminium alkyl and optionally an external electron donor, said process comprising the steps of:
   (A) continuously copolymerizing propylene by introducing streams of propylene, a comonomer selected from the group of ethylene and C4-C10 alpha-olefins, hydrogen and said polymerization catalyst into a loop reactor at a temperature of from 65 to 100° C. a pressure of from 25 to 100 bar and a hydrogen to propylene ratio of from 0.15 to 3.0 mol/kmol to produce slurry of particles of a first copolymer of propylene having a melt flow rate $MFR_2$ of from 0.3 to 3.0 g/10 min and a content of comonomer units of from 0.1 to 6 mol-% in a first reaction mixture;
   (B) withdrawing a slurry stream from said loop reactor, said slurry stream comprising said particles of the first copolymer of propylene, said particles further comprising said polymerization catalyst, and passing the slurry stream into a gas phase reactor;
   (C) continuously copolymerizing propylene by introducing streams of propylene, a comonomer selected from the group of ethylene and C4-C10 alpha-olefins and optionally hydrogen into said gas phase reactor at a temperature of from 65 to 100° C. and a pressure of from 10 to 40 bar to produce particles comprising a copolymer mixture of said first copolymer of propylene and a second copolymer of propylene, said copolymer mixture having a content of comonomer units from 4 to 10 mol-% and a melt flow rate $MFR_2$ of 0.05 to 0.4 g/10 min; wherein said copolymer mixture comprises from 30 to 60% by weight of said first copolymer and from 40 to 70% by weight of said second copolymer, and wherein the melt flow rate $MFR_2$ of said copolymer mixture is lower than the melt flow rate $MFR_2$ of said first copolymer and the content of comonomer units in said copolymer mixture is higher than the content of comonomer units in said first copolymer;
   (D) withdrawing a stream comprising said copolymer mixture from said gas phase reactor;
   (E) removing hydrocarbons from said stream to produce a polymer stream with reduced content of hydrocarbons and optionally introducing additives to the copolymer mixture; and
   (F) extruding said copolymer mixture into pellets.

2. The process according to claim 1 wherein the loop reactor is operated at a temperature within the range of from 70 to 95° C.

3. The process according to claim 1 wherein the melt flow rate $MFR_2$ of the first copolymer of propylene is from 0.35 to 2.0 g/10 min.

4. The process according to claim 1 wherein the content of comonomer units in the first copolymer of propylene is from 0.5 to 5.0% by mole and the content of propylene units is from 95.0 to 99.5% by mole.

5. The process according to claim 1 wherein the gas phase reactor is operated at a temperature within the range of from 75 to 95° C.

6. The process according to claim 1 wherein the melt flow rate $MFR_2$ of the copolymer mixture is from 0.07 to 0.4 g/10 min.

7. The process according to claim 1 wherein the content of polymer soluble in xylene at 25° C. is from 1 to 10% by weight in the first copolymer and from 2 to 15% in the copolymer mixture where the content of polymer soluble in xylene has been determined according to ISO 16152 as described in the specification.

8. The process according to claim 1 wherein the solid component of the Ziegler-Natta polymerization catalyst comprises a transition metal component comprising magnesium, titanium and halogen, and a polymeric component comprising a polymer of vinyl cyclohexane or 3-methyl-1-butene.

9. The process according to claim 1 wherein the ratio of the melt index $MFR_2$ of the copolymer mixture to the melt index $MFR_2$ of the first copolymer is not higher than 0.8.

10. The process according to claim 9 wherein the ratio of the melt index $MFR_2$ of the copolymer mixture to the melt index $MFR_2$ of the first copolymer is not higher than 0.6.

11. The process according to claim 1 wherein the ratio of the comonomer content of the first copolymer to the comonomer content of the copolymer mixture is not higher than 0.95.

12. The process according to claim 11 wherein the ratio of the comonomer content of the first copolymer to the comonomer content of the copolymer mixture is not higher than 0.9.

13. The process according to claim 1 wherein the comonomer present in the second polymerization stage is the same as the comonomer present in the first polymerization stage.

14. A process for producing a pipe comprising the steps of:
   (1) producing a propylene polymer composition according to claim 1;
   (2) extruding said propylene polymer composition into a pipe.

15. The process according to claim 13 wherein the comonomer is ethylene.

* * * * *